US009331989B2

(12) United States Patent
Dover

(10) Patent No.: US 9,331,989 B2
(45) Date of Patent: May 3, 2016

(54) SECURE SHARED KEY SHARING SYSTEMS AND METHODS

(71) Applicant: Micron Technology, Inc., Boise, ID (US)

(72) Inventor: Lance Walker Dover, Citrus Heights, CA (US)

(73) Assignee: Micron Technology, Inc., Boise, ID (US)

( * ) Notice: Subject to any disclaimer, the term of this patent is extended or adjusted under 35 U.S.C. 154(b) by 31 days.

(21) Appl. No.: 14/507,526

(22) Filed: Oct. 6, 2014

(65) Prior Publication Data

US 2016/0099922 A1   Apr. 7, 2016

(51) Int. Cl.
*H04L 9/32* (2006.01)
*H04L 29/06* (2006.01)

(52) U.S. Cl.
CPC ............ *H04L 63/061* (2013.01); *H04L 9/3242* (2013.01); *H04L 63/0428* (2013.01); *H04L 2209/24* (2013.01)

(58) Field of Classification Search
CPC ................................ H04L 9/08; H04L 63/061
USPC .......................................................... 713/171
See application file for complete search history.

(56) References Cited

U.S. PATENT DOCUMENTS

| 5,937,063 | A * | 8/1999 | Davis ................. G06F 12/1408 711/E12.092 |
| 7,779,273 | B2 * | 8/2010 | Dale .................... G06F 9/4405 713/189 |
| 8,156,322 | B2 | 4/2012 | Asnaashari et al. |
| 8,214,630 | B2 * | 7/2012 | Peterka ............ G01R 31/31719 713/1 |
| 2008/0256366 | A1 * | 10/2008 | Dale ...................... G06F 9/4405 713/189 |
| 2010/0082991 | A1 | 4/2010 | Baldwin et al. |
| 2010/0174906 | A1 | 7/2010 | Li |
| 2010/0217964 | A1 * | 8/2010 | Peterka .......... G01R 31/318555 713/2 |
| 2010/0235627 | A1 | 9/2010 | Kerschbaum et al. |
| 2011/0035574 | A1 * | 2/2011 | Jevans .................. G06F 9/4406 713/2 |

(Continued)

FOREIGN PATENT DOCUMENTS

| WO | 2013174554 A1 | 11/2013 |
| WO | 2014132155 A1 | 9/2014 |

OTHER PUBLICATIONS

PCT International Search Report & Written Opinion for PCT Application No. PCT/US2015/051436 mailed Jan. 13, 2016. 12 pgs.

*Primary Examiner* — Teshome Hailu
(74) *Attorney, Agent, or Firm* — Fletcher Yoder, P.C.

(57) ABSTRACT

Systems and methods used to securely communicate a shared key to devices. One embodiment describes a method to securely communicate a shared key to a first device and a second device that includes receiving, using the first device, a shared key and unique identifier pairing associated with the first device from a key generator; receiving, using a trusted third party, the shared key and unique identifier pairing from the key generator; generating, using the first device, a signature using the unique identifier and the shared key; transmitting, using the first device, the signature and the unique identifier to the trusted third party; verifying, using the trusted third party, the unique identifier based on the signature; determining, using the trusted third party, the shared key when the unique identifier is verified; and transmitting, using the trusted third party, the shared key to the second device to enable the first device and the second device to communicate securely by encoding and decoding communicated data using the shared key.

27 Claims, 3 Drawing Sheets

(56) References Cited

U.S. PATENT DOCUMENTS

| | | |
|---|---|---|
| 2012/0008784 A1 | 1/2012 | Hallam-Baker |
| 2013/0080768 A1 | 3/2013 | Lagerway et al. |
| 2013/0173903 A1* | 7/2013 | Obligacion ............ G06F 21/575 713/150 |
| 2013/0173904 A1* | 7/2013 | Obligacion ............. H04L 67/06 713/150 |
| 2013/0173906 A1* | 7/2013 | Obligacion ......... H04L 63/0428 713/151 |
| 2014/0164768 A1 | 6/2014 | Kruglick |

\* cited by examiner

SECURE SHARED KEY SHARING SYSTEMS AND METHODS

BACKGROUND

1. Field of the Invention

The present invention relates generally to the secure communication of a shared cryptographic key, and particularly, to the communication of the shared cryptographic key between devices not connected by a secure channel.

2. Description of the Related Art

Generally, devices may utilize shared cryptographic keys to securely communicate with one another. For example, a first device may utilize the shared key to sign (e.g., encode) data and transmit the signed data to a second device. The second device may then utilize the shared key to verify (e.g., decode) the received data. In this manner, an outside party that intercepts the encoded data would not be able to decode the data without the shared key. Thus, securing communication with the use of a shared key is premised on the communicating devices each knowing the shared key.

In other words, the shared key may be securely communicated to each of the devices before using the shared key to encode and decode data. Often methods for securely communicating the shared key may utilize extensive mathematical calculations. For example, utilizing a Diffie-Hellman approach to communicate a shared key between devices may involve the devices performing modular arithmetic, which may require non-trivial computational processing. However, some devices, such as a memory device, may have limited processing power.

Accordingly, it would be beneficial to improve secure communication of a shared key, for example, by enabling communication of the shared key even with devices having limited processing power.

DETAILED DESCRIPTION OF SPECIFIC EMBODIMENTS

Figure 1:
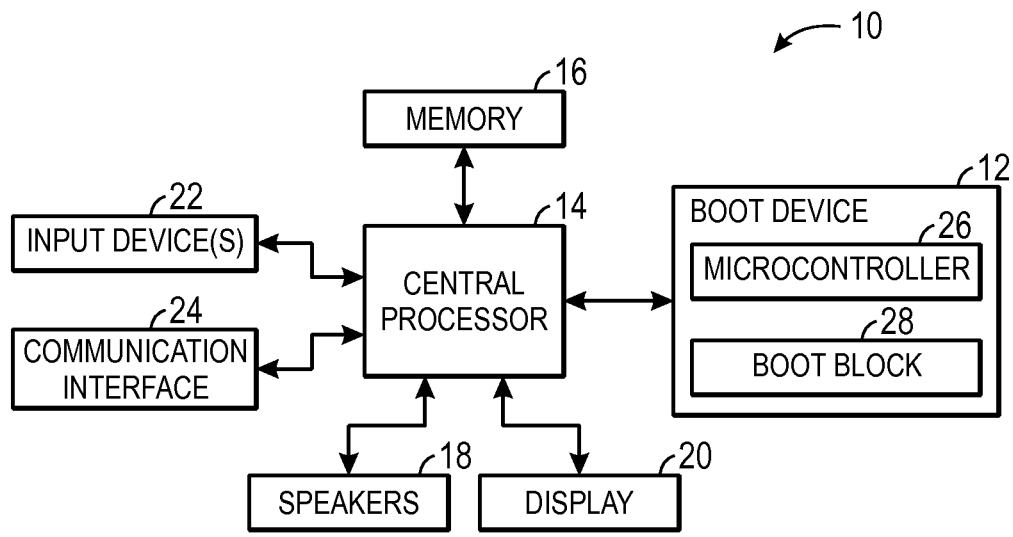
FIG. 1 illustrates a block diagram of a computing system, in accordance with an embodiment.

As described above, shared cryptographic keys are often used by devices to enable secure (e.g., encoded and/or signed) communication. More specifically, the devices may utilize the shared key to sign (e.g., encode) transmitted data and to verify (e.g., decode) received data. For example, a first device may sign data by performing a cryptographic hash on the data using the shared key and transmit the signed data along with the hash result to a second device. The second device may then verify the received data by performing the cryptographic hash using the shared key and comparing the results. As such, devices on either end of the communication may utilize the shared key. In other words, the shared key may be securely communicated to each of the communicating devices.

As can be appreciated, since the shared key is the basis of securing transmitted data, it is important that outside parties do not obtain the shared key. As such, the shared key should be securely communicated to the devices without an outside party determining the shared key. Various methods may be used to facilitate the secured transmission of the shared key to the devices. Such methods may include a Diffie-Hellman key exchange, a Ron Rivest, Adi Shamir and Leonard Adleman (RSA) system approach, or a another public key infrastructure approach. However, these methods may be computationally complex, which utilizes significant processing power.

For example, to utilize a Diffie-Hellman key exchange, a first and a second device may first determine a prime modulus, such as 17, and a primitive root of the prime modulus, such as 3. Then, the first and second devices may each select a secret integer. For example, the first device may select 15 and the second device may select 13. Using their secret integers, the first and second devices may each raise the primitive root to its respective secret integer and perform a modulus operation using the prime modulus. For example, the first device may calculate $3^{15}$ mod 17, which equals 6, and the second device may calculate $3^{13}$ mod 17, which equals 12. The calculated result is then transmitted to the other device. Each receiving device may then raise the received result to its respective secret integer and perform a modulus operation using the prime modulus. For example, the first device may calculate $12^{15}$ mod 17, which equals 10, and the second device may calculate $6^{13}$ mod 17, which also equals 10. In this manner, both the first and second device may determine the shared key, for example, 10.

As such, both the first and second devices typically include processing components to quickly and efficiently perform modular arithmetic. More specifically, the processing components perform multiple exponential and modulus operation calculations. Additionally, to improve security, the size of the numbers used may be increased, for example, up to several hundred digits. In other words, in a real world situation, the exponential and modulus operation calculations may be much more complex than the example presented above.

However, some devices that wish to utilize a shared key for securing data may be limited in their processing capabilities. One such example may be a nonvolatile boot device used to boot a computing system. Generally, the nonvolatile boot device may include a processing component that performs limited operations and that has limited processing capabilities. For example, the processing component may be an arithmetic logic unit (ALU) that merely performs integer arithmetic and logic operations.

Although it may be possible to increase the processing capabilities of such devices, the cost may be prohibitive. In other words, it would be beneficial to enable secure communication of the shared key with the computing system without having to increase the processing capabilities of the nonvolatile boot device.

Accordingly, the present disclosure describes techniques that enable secure communication of a shared key with minimal processing requirements. For example, some embodiments may utilize a shared symmetric key for securing communication, which may be less computationally complex to implement than public key infrastructure (PKI) techniques. More specifically, a shared symmetric key approach may largely be implemented using combinatorial local as compared to more extensive computational calculations used in PKI technique, such as modular arithmetic.

Additionally, some embodiments may securely communicate the shared key through the use of a trusted third party, such as a server. More specifically, a key generator may generate a unique identifier and a shared key pairing for a first device. The pairing may be stored in the first device, for example during manufacture, and in the trusted third party. To communicate the shared key to a second device, the first device may transmit its unique identifier and a signature, which may be generated using the shared key and a nonce (e.g., a random or pseudo-random number), to the trusted third party. The trusted third party may then use the unique identifier to retrieve the corresponding shared key and verify the signature. If the signature is verified, the trusted third party may be assured that the secure key it looked up based on the unique identifier is the same as the secure key stored on the first device. As such, the trusted third party may communicate the shared key to the second device via a secure channel without exposing the shared key on a communication channel between the first device and the second device. Subsequently, the first and second devices may communicate securely using the shared key.

Thus, as will be described in more detail below, the shared key may be securely shared with the devices even when a preexisting secure channel does not exist between the devices. In other words, another party that merely receives the signature and unique identifier may be unable to determine the shared key as long as the party does not have access to the unique identifier and shared key pairing, which may be previous shared with the trusted third party via the secure channel. Additionally, as will be described in more detail below, the shared key may be securely shared with the second device with minimal computing performed by the first device. More specifically, the processing by the first device may include merely generating the signature using the shared key and a nonce, for example, by performing a cryptographic hash operation on the unique identifier.

As described above, the techniques described herein may be particularly useful for a nonvolatile boot device in a computing system. To help illustrate, an embodiment of a computing system 10 with a nonvolatile boot device 12 is described in FIG. 1. The computing system 10 may be any of a variety of types such as a computer, pager, cellular phone, personal organizer, control circuit, etc. The various functional blocks shown in FIG. 1 may include hardware elements (including circuitry), software elements (including computer code stored on a computer-readable medium) or a combination of both hardware and software elements. It should further be noted that FIG. 1 is merely one example of a particular implementation and is intended to illustrate the types of components that may be present in computing system 10.

As depicted, the computing system 10 includes a central processor 14 and memory 16. More specifically, the central processor 14 may execute instructions stored in memory 16 to perform various operations in the presently described techniques. As such, the central processor 14 may include one or more general purpose microprocessors, one or more application specific processors (ASICs), one or more field programmable logic arrays (FPGAs), or any combination thereof. Additionally, the memory 16 may be a tangible, non-transitory, computer-readable medium that stores instructions executable by the central processor 14 and/or data processed by the central processor 14. In some embodiments, the memory 16 may include volatile memory, such as random access memory (RAM), and/or non-volatile memory, such as read only memory (ROM), flash memory, ferroelectric RAM (F-RAM), hard disks, floppy disks, magnetic tape, optical discs, or any combination thereof.

Additionally, the central processor 14 may utilize the other components in the computing system 10 to perform various functions. One function may include the communication of information with a user, which may include providing information to a user and receiving control commands from the user. For example, the central processor 14 may provide audio data to the speakers 18 and instruct the speakers 18 to communicate the audio data to a user as sound. Additionally, the central processor 14 may provide video data to the display 20 and instruct the display 20 to display a graphical user interface that presents information to the user. Furthermore, to facilitate receiving information, the central processor 14 may receive control commands from a user via one or more input devices 22. In some embodiments, the input device 22 may include buttons, switches, a keyboard, a light pen, a mouse, a digitizer and stylus, a voice recognition system, a touch sensitive display, or any combination thereof.

Additionally, information may be communicated with external devices via the communication interface 24. More specifically, the communication interface 24 may enable the computing system 10 to connect to a network, such as a personal area network (e.g., a Bluetooth network), a local area network (e.g., 802.11x Wi-Fi network), and/or for a wide area network (e.g., a 3G cellular network). Additionally, the communication interface 24 may enable the computing system 10 to connect directly to external devices, for example, via serial cables.

To initialize the above-described functions as well as others, startup routine instructions stored in the boot device 12 may be executed. As depicted, the boot device 12 includes a microcontroller 26 and one or more non-volatile memory, such as a boot block 28, which stores the startup routine instructions. Accordingly, upon powering up the computing system 10, the startup routine instructions may be retrieved from the boot block 28 so that the central processor 14 may execute the instructions. More specifically, the startup routine may establish the foundation for proper functioning of the computing system 10. For example, in some embodiments, when the central processor 14 executes the start up routine instruction, a malware error-detection may be performed to detect the presence of malicious, defective, or otherwise corrupted code stored in memory 16.

Accordingly, it is important to ensure secure communication of startup routine instructions from the boot device 12 to the central processor 14. One method may be the use of a shared key. More specifically, the boot device 12 may sign (e.g., encode) startup routine instructions using the shared key and communicate the signed instructions to the central processor 14. The central processor 14 may then verify (e.g., decode) the signed instructions using the shared key and execute the startup routine instructions. In other words, to utilize a shared key, the shared key may be securely shared with both the boot device 12 and the central processor 14.

As described above, various computationally intensive methods for sharing the shared key may be utilized. Thus, to utilize such methods, the processing power of the central processor 14 and the microcontroller 26 should be sufficient to efficiently perform the computations. For example, the microcontroller 26 may be required to efficiently perform modular arithmetic. However, the processing power utilized by the microcontroller 26 to perform other operations, such as encoding/decoding data, may be less than used to perform computationally intensive calculations, such as modular arithmetic.

Accordingly, since the shared key may be shared only when connected to a different central processor 14 or, at most, upon each powering on of the computing device 10, techniques described herein enable securely sharing the shared key with the boot device 12 and the central processor 14 without utilizing computationally intensive calculations and exposing the shared key across an insecure communication channel. As such, the processing capabilities of the microcontroller 26 may be reduced, and thus, the manufacturing costs of the boot device 12 may also be reduced. In other words, the techniques described herein may enable a shared key to be securely communicated even when one party (e.g., device) is limited by processing power.

Figure 2:
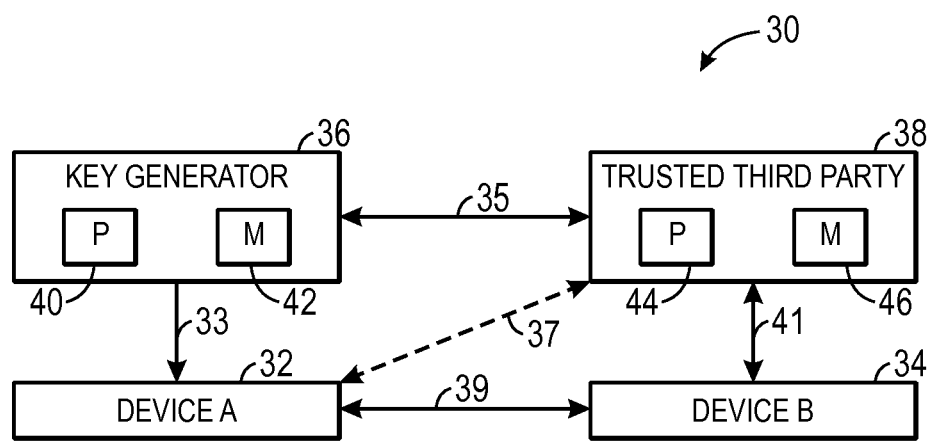
FIG. 2 illustrates a block diagram of devices used to communicate a shared key, in accordance with an embodiment.

However, the techniques described herein are not limited to processing power limited devices. In other words, the techniques may be utilized by any devices to securely communicate a shared key. To help illustrate, a block diagram of a shared key sharing system 30 is described in FIG. 2. In the depicted embodiment, the shared key sharing system 30 may enable secure communication between device A 32 (e.g., boot device 12) and device B 34 (e.g., central processor 14). In other words, the shared key sharing system 30 may securely communicate a shared key with device A 32 and device B 34.

To facilitate communicating the shared key, the key sharing system 30 includes a key generator 36 and a trusted third party 38. In some embodiments, the key generator 36 may generate a unique identifier and shared key pairing for devices at a secure facility. Accordingly, as depicted, the key generator 36 may include one or more processing components 40 and memory 42 to facilitate functions of the key generator 36. In some embodiments, the unique identifier may be an identifier that uniquely identifies device A 32, such as a media access control (MAC) address. Additionally, the shared key may be a cryptographic key (e.g., a symmetric key or a private key) used to secure communicated data.

In some embodiments, the key generator 36 may be part of a manufacturing facility that manufactures device A 32. To help illustrate, when device A 32 is manufactured, the manufacturer may utilize the key generator 36 to generate a unique identifier and shared key pairing and store the pairing in device A 32. For example, the pairing may be statically programmed into the non-volatile memory of device A, such as in a portion of the boot block 28 not directly accessible by or exposed to the central processor 14 or another entity. Additionally, since the pairing is stored while at the secure facility, the possibility of an unwanted intrusion is minimized. As such, the unique identifier and shared key pairing may be securely communicated to device A 32. Accordingly, as depicted, the key generator 36 is communicatively coupled to device A 32, via a first secure communication channel 33.

In addition to generating a pairing for device A 32, the key generator 36 may generate unique identifier and shared key pairings for each of a plurality of devices, for example, for each device manufactured. The generated pairings may then be securely communicated to the trusted third party 38.

Generally, the trusted third party 38 may be a database that is capable of securely communicating with the key generator 36 and securely storing a plurality of unique identifier and shared key pairings. For example, the trusted third party 38 may be a remote server located in the cloud. Accordingly, as depicted, the trusted third party 38 may include one or more processing components 44 to facilitate secure communication with the key generator 36 and memory 46 to store the received pairings.

Any suitable means for securing communication between the key generator 36 and the trusted third party 38 may be utilized. For example, the processing components 40 and 44 may contain sufficient processing capabilities to encrypt the data communicated between the key generator 36 and the trusted third party 38. In some embodiments, the encryption may utilize Data Encryption Standard (DES), Advanced Encryption Standard (AES), International Data Encryption Algorithm (IDEA), RSA encryption, Diffie-Hellman encryption, or another PKI encryption technique. Accordingly, as depicted, the key generator 36 is communicatively coupled to the trusted third party 38 via a second secure communication channel 35. In other words, the key generator 36 and the trusted third party 38 may include sufficient processing power to utilize encryption techniques to secure the second communication channel 35. In some embodiments, the second secure communication channel 35 may utilize a network, such as a wide area network (WAN) or a local area network (LAN).

As will be described in more detail below, when a process for sharing the shared key with device B 34 is initialized, device A 32 may communicate a signature and its unique identifier to the trusted third party 38. In some embodiments, device A 32 may communicate directly with the trusted third party 38. Accordingly, as depicted, device A 32 and the trusted third party 38 may be communicatively coupled via a third communication channel 37, which may not be secure. In some embodiments, the third communication channel 37 may utilize a network, such as a wide area network (WAN) or a local area network (LAN).

In other embodiments, device A 32 may communicate with the trusted third party 38 through device B 34. In other words, device A 32 may communicate the signature and its unique identifier to device B 34 and device B 34 may relay the unique identifier and the signature to the trusted third party 38. Accordingly, as depicted, device A 32 is communicatively coupled to device B 34 via a fourth communication channel 39, which may not initially be secure. For example, in the computing device 10, the fourth communication channel 39 may be a data bus that communicatively couples the central processor 14 and the boot device 12.

As will be described in more detail below, once the trusted third party 38 receives the unique identifier and signature, the trusted third party 38 may use the received unique identifier to retrieve the corresponding shared key and use the shared key to verify the received signature. If the signature is verified, the trusted third party 38 may securely communicate the shared key to device B 34.

Generally, any suitable means for securing communication between the trusted third party 38 and device B 34 may be utilized. For example, the processing components 40 and the central processor 14 may contain sufficient processing capabilities to encrypt the data communicated between the trusted third party 38 and device B. In some embodiments, the encryption may utilize Data Encryption Standard (DES), Advanced Encryption Standard (AES), International Data Encryption Algorithm (IDEA), RSA encryption, Diffie-Hellman encryption, or another PKI encryption technique. Accordingly, as depicted, the trusted third party 38 is communicatively coupled to device B 34 via a fifth secure communication channel 41. In other words, the trusted third party 38 and device B 34 may include sufficient processing power to utilize encryption techniques to secure the fifth communication channel 41. For example, in the computing device 10, the central processor 14 and the trusted third party may be communicatively coupled via a network connected to the communication interface 24. In other words, the fifth secure communication channel 41 may utilize a network, such as a wide area network (WAN) or a local area network (LAN).

Once device B 34 receives the shared key, device A 32 and device B 34 may communicate securely by encoding and decoding communicated data using the shared key. In this manner, the data communicated between device A 32 and device B is secured by signing the data using the shared key, which verifies the integrity of the communicated data. As described above, securely communicating the shared key utilizing the techniques described herein may be enabled by setting up the key sharing system 30.

Figure 3:
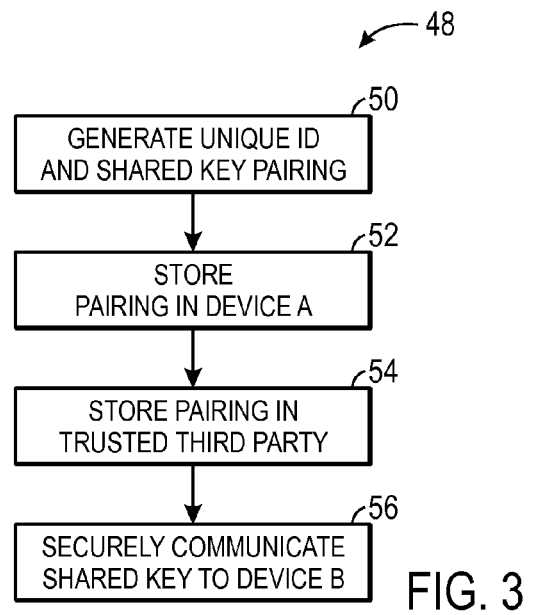
FIG. 3 illustrates a process flow for preparing the devices of FIG. 2 to communicate a shared key, in accordance with an embodiment.

One embodiment of a process 48 for setting up the key sharing system 30 is described in FIG. 3. Generally, the process 48 includes generating a unique identifier and a shared key pairing (process block 50), storing the pairing in a first device (process block 52), transmitting the pairing for storage in a trusted third party (process block 54), and securely communicating a shared key to a second device (process block 56). In some embodiments, process 48 may be implemented by instructions stored in one or more tangible, non-transitory, computer readable medium, such as memory 16, 42, or 46 and/or boot block 28 (either alone or in combination), and executed by one or more processing components, such as central processor 14, processing component 40 or 44, and/or microcontroller 26 (either alone or in combination).

Accordingly, in some embodiments, the key generator 36 may generate a unique identifier and shared key pairing for device A 32 (process block 50). More specifically, the key generator 36 may generate the unique identifier to uniquely identify device A 32. For example, in some embodiments, the unique identifier may be a MAC address, which includes a serial number and a manufacturer identifier. More specifically, the serial number may indicate the order in which device A 32 was manufactured. In other words, to generate the serial number, the key generator 36 may assign a serial number to one device, increment the serial number, and assign the incremented serial number to the next device. In other embodiments, the unique identifier may be a randomly generated, for example, based on sets of rules.

Additionally, the key generator 36 may generate the shared key, which may be used to encode/decode communicated data with device A 32. More specifically, the shared key may be generated based on the type of encoding/decoding used for communication between device A and device B. In some embodiments, the shared key may be generated based on particular sets of rules. In other embodiments, the shared key may be a large randomly generated string, which may include numbers, letters, and/or symbols. The size of the shared key may be selected to reduce the possibility of an outside party being able to guess all possibilities of the key. Accordingly, the shared key may be 80 bits, 128 bits, 256 bits, or more.

In some embodiments, the unique identifier and the shared key may be generated separately. For example, the unique identifier for device A 32 may be generated by a manufacturer, which may not have access to an algorithm for generating the shared key. Subsequently, a separate secure facility may generate the shared key. In other words, the key generator 36 may include a manufacturing facility and/or additional secure facilities.

Once the unique identifier and the shared key for device A 32 are generated, the key generator 36 may store the pairing in memory 42. More specifically, the unique identifier and the shared key may be stored such that they correspond to one another. In other words, the corresponding shared key may be determined based on the unique identifier. In some embodiments, when the shared key is paired with a single unique identifier, the unique identifier may be determined based on the shared key Additionally, the key generator 36 may store the unique identifier and the shared key pairing in device A 32 (process block 52). In some embodiments, the pairing may be stored in device A 32 during manufacture. For example, during manufacture of the boot device 12, the key generator 36 may statically program the pairing into the non-volatile memory not directly accessible by or exposed to another entity, such as a portion of the boot block 28 not directly accessible by the central processor 14. In some embodiments, the pairing may be hardwired into device A 32, for example, using a discrete circuit. In other embodiments, the unique identifier for device A 32 may be stored by a manufacturer, which may not have access to the shared key. Subsequently, a separate secure facility, for example the secure facility that generated the shared key, may store the shared key in device A such that it is paired with the unique identifier. In other words, the pairing may be stored in the boot device 12 after the manufacture of the boot device 12 is complete.

More specifically, the pairing may be stored in device A 32 at a secure facility, such as a manufacturing facility. In some embodiments, the secure facility may include an intrusion prevention system to reduce the possibility of an outside party gaining access to the pairing. As such, particularly when the pairing is stored during manufacture, the shared key may be communicated to device A 32 securely.

Furthermore, the unique identifier and the shared key pairing may be stored in the trusted third party 38 (process block 54). More specifically, the pairing may be communicated from the key generator 36 to the trusted third party 38, for example, via a network. In such embodiments, the pairing may be securely communicated by encrypting the transferred data. More specifically, the key generator 36 may encrypt the pairing and communicate the encrypted pairing to the trusted third party 38. The trusted third party 38 may then decrypt the received pairing and store the decrypted pairing in memory 46.

Then, the shared key may be securely communicated from the trusted third party 38 to device B 34 (process block 56). In some embodiments, the shared key may be communicated from the trusted third part 38 to device B 34, for example, via a network. In such embodiments, the shared key may be securely communicated by encrypting the transferred data. More specifically, the trusted third party 38 may encrypt the shared key and communicate the encrypted key to device B 34. Device B 34 may then decrypt the received key and store the decrypted shared key, for example, in memory 16.

Figure 4:
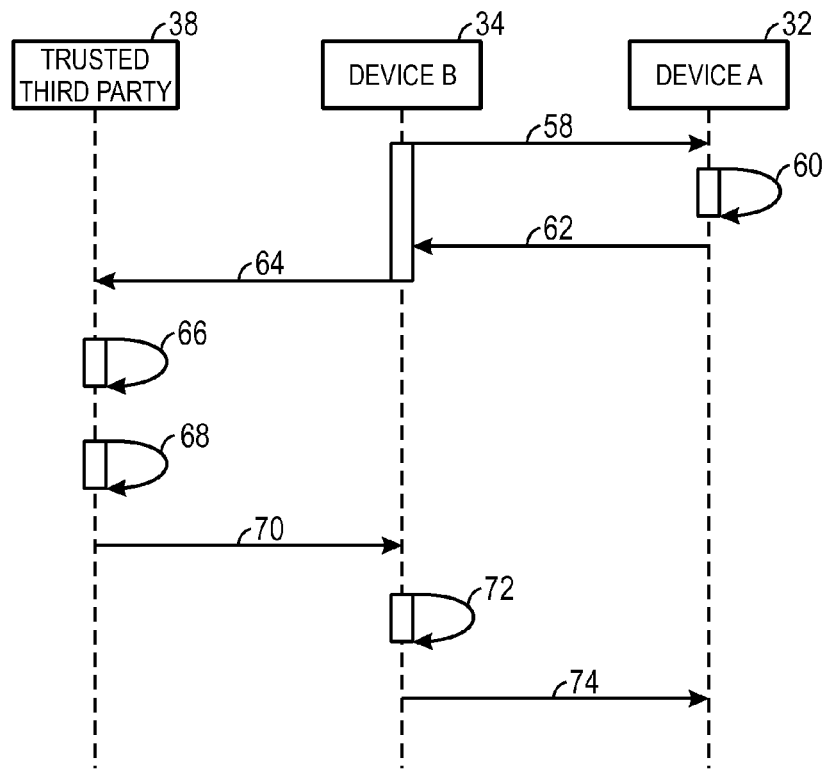
FIG. 4 illustrates a data flow diagram between the devices of FIG. 2, in accordance with an embodiment.

However, since the shared key is used to secure communication between device A 32 and device B 34, the shared key must be kept secret. Accordingly, the process for communicating the shared key to device B 34 may include security measures to reduce the possibility of an outside party obtaining the shared key. To help illustrate, a data flow between the trusted third party 38, device B 34, and device A 32 used to communicate the shared key is described in FIG. 4.

In the depicted embodiment, device B 34 may transmit a request to device A 32 for its unique identifier and a signature (arrow 58). For example, in the computing system 10, the central processor 14 may communicate the request to the boot device 12 via a data bus. In some embodiments, the signature may be generated using a nonce, which may be a random or pseudo-random number used to provide originality of a message. Accordingly, along with the request, device B 34 may transmit the nonce. In other embodiments, the trusted third party 38 may transmit (not shown) the request along with the nonce to device A 32.

In response to the request, device A 32 may generate the signature (arrow 60). In some embodiments, the signature may be generated by performing a cryptographic hash on the unique identifier using the nonce and the shared key. For example, in the computing system 10, the microcontroller 26 may generate the signature.

Then, device A 32 may transmit the unique identifier along with the signature to device B 34 (arrow 62) and device B 34 may relay the unique identifier and the signature to the trusted third party (arrow 64). For example, in the computing system 10, the boot device 12 may communicate the unique identifier and the signature to the central processor 14 via a data bus. The central processor 14 may relay the unique identifier and the signature to the trusted third party via a network connected to the communication interface 24. In other embodiments, device A 32 may communicate (not shown) the unique identifier and the signature directly to the trusted third party 38.

Using the received unique identifier, the trusted third party 38 may retrieve the shared key stored in device A 32 (arrow 66). Additionally, using the shared key, the trusted third party 38 may verify the received signature (arrow 68). For example, with reference to the computing system 10 described above, the trusted third party 38 may retrieve the shared key from memory 46 and verify the signature using processing component 44. More specifically, the trusted third party 38 may verify the signature by performing the same operation (e.g., a cryptographic hash) on the unique identifier using the shared key as performed by device A 32 to generate the signature.

If the signature determined by the trusted third party 38 matches the signature received from device A 32, the trusted third party 38 may communicate the shared key to device B 34 (arrow 70). For example, with reference to the computing system 10 described above, the trusted third party 38 may communicate the shared key to the central processor 14 via a network connected to the communication interface 24.

Once the shared key is received, device B 34 may store the shared key (arrow 72). For example, in the computing system 10, the central processor 14 may store the shared key in memory 16. As described above, limiting the exposure of the shared key is important. As such, the central processor 14 may store the shared key so that it is not directly accessible by or exposed to another entity. In other words, the shared key may be stored securely in device B.

In this manner, subsequent communication between device A 32 and device B 34 (arrow 74) may be secured by using the shared key to verify the integrity of transmitted data, for example, by signing the transmitted data with the shared key. For example, in the computing system 10, the central processor 14 may retrieve the shared key from memory 16 and sign (e.g., encode) the data by performing a cryptographic hash using the shared key. Upon receiving the signed data, the microcontroller 26 may retrieve the shared key from the non-volatile memory (e.g., boot block 28) and verify (e.g., decode) the data by performing the same cryptographic hash using the shared key. More specifically, the results may be verified by comparing the results of the cryptographic hash performed by the central processor 14 with the results of the cryptographic hash performed by the microcontroller 26. And, when the results match, the microcontroller 26 may verify the identity of the central processor 14 and/or that the data has not been altered. The microcontroller 26 may then process verified data.

Similarly, the microcontroller 26 may retrieve the shared key from the non-volatile memory (e.g., boot block 28) and sign (e.g., encode) the data by performing a cryptographic hash using the shared key. Upon receiving the signed data, the central processor 14 may retrieve the shared key from memory 16 and verify (e.g., decode) the data by performing the same cryptographic has using the shared key. More specifically, the results may be verified by comparing the results of the cryptographic hash performed by the central processor 14 with the results of the cryptographic hash performed by the microcontroller 26. And, when the results match, the central processor 14 may verify the identity of the microcontroller 26 and/or that the data has not been altered. The central processor 14 may then process the verified data. Various encoding/decoding techniques may be utilized such as Twofish, Serpent, AES, Blowfish, CASTS, RC4, 3DES, and IDEA, for example. As such, the communication of data may be secured without exposing the shared key to other entities.

Figure 5:
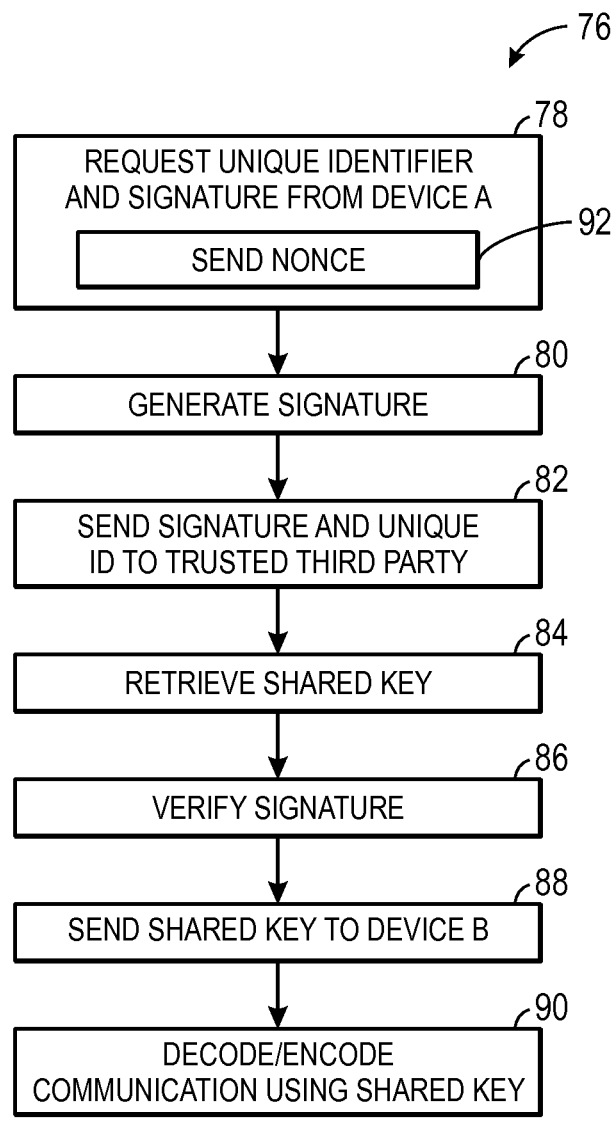
FIG. 5 illustrates a process flow for securely communicating the shared key between the devices of FIG. 2, in accordance with an embodiment.

One embodiment of a process 76 for implementing the data flow is described in FIG. 5. Generally the process 76 includes requesting a unique identifier and a signature from a first device (process block 78), generating the signature (process block 80), sending the unique identifier and the signature to a trusted third party (process block 82), retrieving a shared key (process block 84), verifying the signature (process block 86), sending the shared key to a second device (process block 88), and decoding/encoding communication using the shared key (process block 90). In some embodiments, process 76 may be implemented by instructions stored in one or more tangible, non-transitory, computer readable medium, such as memory 16, 42, or 46 and/or boot block 28, and executed by one or more processing component, such as central processor 14, processing component 40 or 44, and/or microcontroller 26.

As in the data flow, the process 76 may be initialized by device B 34. For example, the device B 34 may initialize the process 76 when device B 34 determines that communication with device A 32 is desired but that device B 34 does not know the shared key. In other embodiments, the process 76 may be initialized by the trusted third party 38 and/or device B 34. For example, the process 76 may be initialized when device B 34 or the trusted third party 38 determines that device B 34 and device A 32 are communicatively coupled for a first time, for example, upon commissioning of the computing system 10 or upon each power on of the computing system 10.

Once the process 76 is initialized, a request for a unique identifier and a signature are communicated to device A 32 (process block 78). As in the data flow, the request may be communicated from device B 34 to device A 32, for example, when device B 34 initializes the process 76. In other embodiments, when the trusted third party 38 initializes the process 76, the request may be communicated from the trusted third party 38 to device B 34 and device B 34 may relay the request the device A 32. Additionally or alternatively, the request may be communicated directly from the trusted third party 38 to device A 32.

As described above, the signature may be generated using the unique identifier, the shared key, and/or a nonce. Accordingly, the nonce used to generate the signature may be communicated to device A 32 along with the request (process block 92). Generally, the nonce may be a random or pseudo-random number. In some embodiments, the nonce may be generated by the trusted third party 38 so that the trusted third party 38 may utilize the nonce to verify the signature returned by device A 32. In other embodiments, the nonce may be generated by device B 34 and communicated to both devices A 32 and the trusted third party 38.

In response to receiving the request, device A 32 may generate a signature (process block 80). More specifically, device A 32 may generate the signature using the shared key and the received nonce. In some embodiments, device A 32 may generate the signature by performing a cryptographic hash on the unique identifier using the shared key and the nonce as the key. The output (e.g., result) of the cryptographic hash function is the signature. Additionally, since the nonce may be a random or pseudo random number, the signature may be difficult for an outside party to recreate.

Device A 32 may then communicate the generated signature and its unique identifier to the trusted third party 38 (process block 82). As in the data flow, the signature and unique identifier may be communicated from device A 32 to device B 34 and device B 34 may relay the signature and unique identifier to the trusted third party 38. Additionally or alternatively, the signature and unique identifier may be communicated directly from device A 32 to the trusted third party 38.

Using the received unique identifier, the trusted third party 38 may retrieve the corresponding shared key for device A 32 (process block 84). As described above, the trusted third party 38 may store unique identifier and shared key pairings for multiple devices, for example, in memory 46. Accordingly, the trusted third party 38 may search the stored pairings to find the shared key that corresponds with the received unique identifier.

The trusted third party 38 may then verify the signature received from device A 32 (process block 86). More specifically, since the trusted third party 38 has the shared key and the nonce, the trusted third party 38 may perform the same operation used by device A 32 to generate the signature. For example, the trusted third party 38 may perform the same cryptographic hash on the unique identifier using the shared key and the nonce as the key. The output of the cryptographic hash function may then be compared with the received signature. If the signatures match, the trusted third party 38 may determine that device A 32 does in fact know the shared key. In other words, since the shared key is unique to device A 32, the trusted third party 38 may use the signature to verify the identity of device A 32.

On the other hand, if the signatures do not match, the trusted third party 38 may determine that an outside party is pretending to be device A 32. In other words, the trusted third party 38 may determine that the outside party is attempting to determine the shared key. In some embodiments, this may indicate an attempted intrusion into the computing system 10. As such, the trusted third party 38 may block further attempts to retrieve the shared key and/or notify an operator of the possible intrusion.

If the signature is verified, the trusted third party 38 may securely communicate the shared key to device B 34 (process block 88). More specifically, the trusted third party 38 may encrypt the shared key and transmit the encrypted key to device B 34. Device B 34 may then decrypt and store the shared key, for example, in memory 16.

Subsequently, device A 32 and device B 34 may communicate securely by encoding and decoding data using the shared key (process block 90). Generally, device A 32 may sign (e.g., encode) data using the shared key and transmit the signed data to device B 34. In some embodiments, device A 32 may sign the data by performing a cryptographic hash on the data using the shared key. Device A 32 may then transmit the signed data to device B. In some embodiments, the signed data may include the data along with a result of a cryptographic hash performed by device A 32. Device B 34 may then verify (e.g., decode) and process the received data. In some embodiments, Device B 34 may verify the signed data by performing the same cryptographic hash on the data and comparing the result of the cryptographic hash performed by device A 32 with the result of the cryptographic hash performed by device B 34. More specifically, when the results match, device B 34 may verify the identity of device A 32 and/or that the data has not been modified (e.g., tampered with). Additionally, in some embodiments, the same cryptographic hash function may be by device A 32, the trusted third party 38, and device B 34 to generate the signature and to sign/verify transmitted data.

In this manner, device A 32 and device B 34 may set up a secure communication channel (e.g., communication channel 39). Accordingly, in the computing system 10, the boot device 12 may securely communicate the startup routine instructions to the central processor 14. More specifically, the microcontroller 26 may sign (e.g., encode) the startup routine instructions using the shared key and transmit the encoded instructions to the central processor 14. The central processor 14 may then verify (e.g., decode) the instructions and execute the startup instructions. Additionally, since the shared key is securely communicated to both the central processor 14 and the boot device 12, the risk of an outside party altering the startup routine instructions is minimized.

Thus, the technical effects of the present disclosure include enabling the secure communication of a shared key to devices. In fact, the present techniques enable the shared key to be securely communicated to devices even when one of the devices is limited in processing power.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method to securely communicate a shared key to a first device comprising a boot device and a second device comprising a central processor configured to be communicatively coupled via a data bus, comprising:
   receiving, using the first device, a shared key and unique identifier pairing associated with the first device from a key generator;
   receiving, using a trusted third party, the shared key and unique identifier pairing from the key generator;
   generating, using the first device, a signature using the unique identifier and the shared key;
   transmitting, using the first device, the signature and the unique identifier to the trusted third party, wherein the trusted third party is communicatively coupled to the central processor via a network;
   verifying, using the trusted third party, the unique identifier based on the signature;
   determining, using the trusted third party, the shared key when the unique identifier is verified; and
   transmitting, using the trusted third party, the shared key to the second device to enable the first device and the second device to communicate securely by encoding and decoding communicated data using the shared key comprising:
   signing, using the boot device, startup routine instructions stored in the boot device by encoding the startup routine instructions using the shared key;
   transmitting, using the boot device, the signed startup routine instructions to the central processor;
   verifying, using the central processor, the signed startup routine instructions by decoding the signed startup routine instructions using the shared key; and
   executing, using the central processor, the startup routine instructions to initialize a computing system.

2. The method of claim 1, wherein transmitting the signature and the unique identifier comprises transmitting the signature and the unique identifier in response to a request received from the trusted third party or the second device.

3. The method of claim 2, wherein the request comprises a nonce and generating the signature comprises performing a cryptographic hash on the unique identifier using the shared key and the nonce.

4. The method of claim 2, comprising transmitting when the trusted third party or the second device determines that:
- the first device and the second device are communicatively coupled a first time;
- the second device is powered on;
- the second device does not know the shared key; or any combination thereof.

5. A tangible, non-transitory, computer readable medium configured to store instructions executable by a processor, wherein the instructions comprise instructions to:
- store, using a trusted third party, a shared key and unique identifier pairing associated with a first device comprising a boot device;
- verify, using the trusted third party, identity of the first device based at least in part on a signed unique identifier received from the first device using the shared key, wherein the signed unique identifier comprises the unique identifier and a signature generated by the first device using the unique identifier and the shared key;
- determine, using the trusted third party, the shared key based at least in part on the unique identifier when the identity of the first device is verified, wherein the trusted third party is configured to store a plurality of unique identifier and shared key pairings associated with different devices;
- transmit, using the trusted third party, the shared key to a second device comprising a central processor configured to be communicatively coupled to the boot device via a data bus and to the trusted third party via a network to enable the first device and the second device to communicate securely by encoding and decoding communicated data using the shared key, wherein enabling the first device and the second device to communicate securely comprises enabling:
  - the second device to sign startup routine instructions stored in the second device by encoding the startup routine instructions using the shared key;
  - the second device to transmit the signed startup routine instructions to the first device;
  - the first device to verify the signed startup routine instructions by decoding the signed startup routine instructions using the shared key; and
  - the first device to execute the startup routine instructions to initialize a computing system.

6. The computer readable medium of claim 5, comprising instructions to:
- generate, using the trusted third party, a nonce; and
- send, using the trusted third party, a request to the first device requesting the signed unique identifier, wherein the request comprises the nonce to enable the first device to generate the signature by performing a first cryptographic hash operation on the unique identifier using the shared key and the nonce.

7. The computer readable medium of claim 6, wherein the instructions to verify the identity of the first device comprises instructions to compare the signature to an output of a second cryptographic hash operation performed by the trusted third party using the unique identifier, the shared key, and the nonce.

8. The computer readable medium of claim 5, wherein the instructions to transmit the shared key to the second device comprise instructions to encrypt the shared key using a public key infrastructure encryption technique.

9. The computer readable medium of claim 5, wherein the instructions to determine the shared key comprise instructions to match the unique identifier with one of the plurality of pairings.

10. A method to manufacture a first device comprising a boot device, comprising:
- generating, using a key generator, a unique identifier that uniquely identifies the first device;
- generating, using the key generator, a shared key that is configured to be used by the first device to encode transmitted data and decode received data;
- storing, using the key generator, the unique identifier and the shared key in the first device; and
- transmitting, using the key generator, the unique identifier and the shared key from the key generator to a trusted third party to enable the trusted third party to:
  - store the unique identifier and the shared key as a pairing; and
  - transmit the shared key to a second device comprising a central processor communicatively coupled to the first device via a data bus and the trusted third party via a network to enable the first device and the second device to communicate securely by encoding and decoding data using the shared key, wherein enabling the first device and the second device to communicate securely comprises enabling:
    - the second device to sign startup routine instructions stored in the second device by encoding the startup routine instructions using the shared key,
    - the second device to transmit the signed startup routine instructions to the first device:
    - the first device to verify the signed startup routine instructions by decoding the signed startup routine instructions using the shared key; and
    - the first device to execute the startup routine instructions to initialize a computing system.

11. The method of claim 10, wherein transmitting the unique identifier and the shared key to the trusted third party comprises encrypting the unique identifier and the shared key using a public key infrastructure encryption technique and transmitting the encrypted unique identifier and shared key over the network.

12. The method of claim 10, wherein generating the unique identifier comprises generating a media access control address.

13. The method of claim 10, wherein generating the shared key comprises generating a symmetric key.

14. The method of claim 10, wherein storing the unique identifier and the shared key in the first device comprises statically programming memory in the first device during manufacture of the first device such that the shared key is not accessible by another entity.

15. A non-volatile boot device, comprising:
- one or more non-volatile memory configured to store a unique identifier, a shared key, and startup routine instructions executable by a processor to initialize a computing system, wherein the non-volatile boot device is configured to be communicatively coupled to the processor via a data bus; and
- a microcontroller configured to:
  - receive a request to provide the unique identifier and a signature to a trusted third party, wherein the request comprises a nonce;
  - generate the signature using the unique identifier, shared key, and the nonce;
  - instruct the non-volatile boot device to transmit the signature and the unique identifier to a trusted third party to enable the trusted third party to determine the shared key and to communicate the shared key to the processor via a network;

sign the startup routine instructions by encoding the startup routine instructions using the shared key; and instruct the non-volatile boot device to transmit the signed startup routine instructions to the processor via a data bus to enable the processor to:

verify the signed startup routine instructions by decoding the signed startup routine instructions using the shared key; and execute the startup routine instructions to initialize the computing system when the startup routine instructions are verified.

16. The non-volatile boot device of claim 15, wherein the microcontroller is configured to:

encode the startup routine instructions by performing a cryptographic hash using the shared key; and instruct the non-voltage boot device to transmit the signed startup routine to the processor to enable the processor to verify the startup instructions by performing the cryptographic hash using the shared key and comparing a result of the cartographic hash performed by the microcontroller and a result of the cryptographic hash performed by the processor.

17. The non-volatile boot device of claim 15, wherein the trusted third party is configured to verify the unique identifier using the signature and to communicate the shared key to the processor when the unique identifier is verified.

18. The non-volatile boot device of claim 15, wherein the nonce is a random or pseudorandom number.

19. The non-volatile boot device of claim 15, wherein:

the microcontroller is configured to receive the request from the processor via the data bus and to instruct the non-volatile boot device to transmit the signature and the unique identifier to the processor via the data bus; and the processor is configured to transmit the signature and the unique identifier to the trusted third party via the network.

20. The non-volatile boot device of claim 15, wherein the one or more non-volatile memory comprises a non-volatile boot block.

21. A tangible, non-transitory, computer readable medium configured to store instructions executable by a processor of a computing system, wherein the instructions comprise instructions to:

instruct, using the processor, the computing system to transmit a request from the processor to a device comprising a boot device to request a unique identifier and a signature from the device, wherein the signature is generated based at least in part on a shared key stored in the device;

receive, using the processor, the unique identifier and the signature from the device;

instruct, using the processor, the computing system to transmit the unique identifier and the signature to a trusted third party via a network to enable the trusted third party to determine the shared key;

receive, using the processor, the shared key from the trusted third party; and communicate, using the processor, with the device via a data bus by encoding data transmitted to the device and decoding data received from the device using the shared key, wherein the instructions to communicate with the device comprise instructions to:

receive startup routine instructions signed by the device using the shared key;

verify the startup routine instructions by decoding the signed startup routine instructions using the shard key; and execute the startup routine instructions to initialize the computing system after the startup routine instructions are verified.

22. The computer readable medium of claim 21, wherein the instructions to instruct the computing system to transmit the request comprise instructions to instruct the computing system to transmit the request when the processor is initially coupled to the device.

23. The computer readable medium of claim 21, comprising instructions to receive the request from the trusted third party.

24. The computer readable medium of claim 21, comprising instructions to:

generate, using the processor, a nonce; and transmit the nonce from the processor to the device and the trusted third party.

25. A computing system, comprising:

a first device comprising a boot device configured to be communicatively coupled to a second device comprising a central processor via a data bus, wherein the first device is configured to:

communicate securely with the second device using a shared key;

enable the second device to determine the shared key by transmitting a unique identifier and a signature associated with the first device to a trusted third party communicatively coupled to the second device via a network;

sign data by performing a first cryptographic hash using the shared key after the second device receives the shared key from the trusted third party, wherein the data comprises startup routine instructions; and transmit the signed data to the second device to enable the second device to:

verify the data by performing a second cryptographic hash using the shared key and comparing a result from the first cryptographic hash with a result from the second cryptographic hash; and execute the data to initialize the computing system when the data is verified.

26. The computing system of claim 25, wherein the first device is configured to transmit the unique identifier and the signature to the trusted third party in response to a request received from the second device or the trusted third party to enable the trusted third party to verify identity of the first device and communicate the shared key to the second device when the identity of the first device is verified.

27. The computing system of claim 25, wherein the first device is configured to generate the signature by performing the first cryptographic hash on the unique identifier, wherein the first cryptographic hash is a same operation as the second cryptographic hash.

* * * * *